(12) United States Patent
Ueda et al.

(10) Patent No.: US 8,541,965 B2
(45) Date of Patent: Sep. 24, 2013

(54) MOTOR CONTROLLER AND ELECTRONIC POWER STEERING APPARATUS

(75) Inventors: Takeshi Ueda, Kashiba (JP); Yuji Kariatsumari, Yamatotakada (JP); Shigeki Nagase, Nabari (JP); Noboru Niguchi, Kashihara (JP); Hiroshi Sumasu, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 453 days.

(21) Appl. No.: 12/935,774

(22) PCT Filed: Mar. 30, 2009

(86) PCT No.: PCT/JP2009/056496
§ 371 (c)(1),
(2), (4) Date: Sep. 30, 2010

(87) PCT Pub. No.: WO2009/123113
PCT Pub. Date: Oct. 8, 2009

(65) Prior Publication Data
US 2011/0025238 A1    Feb. 3, 2011

(30) Foreign Application Priority Data
Mar. 31, 2008  (JP) .................................. 2008-091978

(51) Int. Cl.
*H02P 6/08*    (2006.01)

(52) U.S. Cl.
USPC ............. 318/400.02; 318/400.09; 318/400.22

(58) Field of Classification Search
USPC .................. 318/700, 400.01, 400.02, 400.09, 318/400.15, 400.22, 432–434
See application file for complete search history.

(56) References Cited

U.S. PATENT DOCUMENTS

| 5,504,404 A | 4/1996 | Tamaki et al. |
| 2002/0125064 A1* | 9/2002 | Mori et al. ..................... 180/444 |

(Continued)

FOREIGN PATENT DOCUMENTS

| CN | 101121414 A | 2/2008 |
| JP | 7 170800 | 7/1995 |

(Continued)

OTHER PUBLICATIONS

Combined Chinese Office Action and Search Report issued Jul. 16, 2012 in Chinese Patent Application No. 200980111531.5 (with English-language translation).

(Continued)

*Primary Examiner* — Bentsu Ro
(74) *Attorney, Agent, or Firm* — Oblon, Spivak, McClelland, Maier & Neustadt, L.L.P.

(57) ABSTRACT

A command current setting portion has a target value corrector that calculates d-axis and q-axis current command values idc, iqc that are to be supplied to an open-loop controller, based on d-axis and q-axis current target values id*, iq*. When d-axis and q-axis voltage target value vd*, vq* calculated from the d-axis and q-axis current target values id*, iq* by the motor circuit equations exceed a voltage limit, this target value corrector 26 corrects the d-axis and q-axis current target values id*, iq* by the field weakening control such that d-axis and q-axis voltages vd, vq and d-axis and q-axis currents id, iq satisfy $\sqrt{(vd^2+vq^2)} \leq Vlim$ and $\sqrt{(id^2+iq^2)} \leq Ilim$ respectively. The d-axis and q-axis current command values idc, iqc are obtained by this correction.

5 Claims, 15 Drawing Sheets

(56) References Cited

U.S. PATENT DOCUMENTS

| | | | | |
|---|---|---|---|---|
| 2008/0024082 | A1* | 1/2008 | Atarashi et al. | 318/496 |
| 2008/0030155 | A1* | 2/2008 | Patel et al. | 318/400.02 |
| 2009/0069980 | A1 | 3/2009 | Sakamaki | |
| 2009/0079375 | A1* | 3/2009 | Suzuki | 318/434 |
| 2009/0295316 | A1* | 12/2009 | Patel et al. | 318/400.02 |

FOREIGN PATENT DOCUMENTS

| | | |
|---|---|---|
| JP | 2002 345281 | 11/2002 |
| JP | 2003 304697 | 10/2003 |
| JP | 2006 248389 | 9/2006 |
| JP | 2007 118785 | 5/2007 |
| JP | 2008 29088 | 2/2008 |
| WO | 2006 109809 | 10/2006 |

OTHER PUBLICATIONS

Office Action issued Oct. 10, 2012, in Japanese Patent Application No. 2008-091978 with English translation.
International Search Report issued Jun. 23, 2009 in PCT/JP09/056496 filed Mar. 30, 2009.

* cited by examiner

MOTOR CONTROLLER AND ELECTRONIC POWER STEERING APPARATUS

TECHNICAL FIELD

The present invention relates to a motor controller for driving a brushless motor, and an electronic power steering apparatus equipped with such motor controller.

BACKGROUND ART

In the prior art, the electronic power steering apparatus for applying the steering assist force to the steering mechanism of the vehicle by driving the electronic motor in response to the steering torque that the driver applies to the steering wheel (handle) is employed. As the electronic motor of the electronic power steering apparatus, the brush motor is employed widely in the prior art. From the aspects of an improvement in reliability and durability, a reduction in inertia, etc., the brushless motor is also employed nowadays.

Commonly, when the brushless motor is driven at a high revolution and heavy load state, the voltage to be applied to the brushless motor becomes large. But actually the applied voltage to the brushless motor is subjected to restriction of the power supply voltage. Therefore, the control device for driving the brushless motor applies the control such that the applied voltage to the brushless motor does not exceed a predetermined voltage limit value (see Patent Literatures JP-A-2003-304697, WO2006/109809, JP-A-2008-29088, for example). As a result, when the revolution number N (per unit time) exceeds a certain value, an output torque of the brushless motor (referred to as a "motor torque" hereinafter) is decreased shown in FIG. 13($a$), and a desired motor torque cannot be obtained.

As the method of suppressing a reduction in the motor torque in the high revolution range, a field-weakening control for supplying a negative d-axis current id to the brushless motor such that the magnetic flux of the revolving field as the rotor in the brushless motor in the d-axis direction is weakened is known in the prior art (see JP-A-2002-345281, JP-A-2006-248389, for example). When this field-weakening control is applied to the brushless motor, the motor torque Tm (N) is changed with respect to the revolution number N as indicated with a solid line FIG. 13($b$), and a reduction in torque caused due to an increase in the revolution number N can be suppressed.

DISCLOSURE OF THE INVENTION

Problems that the Invention is to Solve

However, when it is intended to supply a q-axis current to the brushless motor such that the motor torque is maximized within a range that does not exceeds a predetermined voltage limit value, the d-axis current should also be increased. As a result, when a desired motor torque should be obtained in the high revolution range by the field-weakening control, electric currents flowing through wiring patterns or switching elements of the driving circuits, etc. contained in the motor controller exceed a tolerance and it is possible that the motor controller is damaged.

Therefore, it is an object of the present invention to provide a motor controller which is capable of applying a field-weakening control while avoiding damages of a driving circuit, etc. in a high revolution range of a brushless motor. Also, it is another object of the present invention to provide an electronic power steering apparatus equipped with such motor controller.

Means for Solving the Problems

A first invention provides a motor controller capable of applying a field-weakening control to drive a brushless motor, which includes:

a command current setting section that decides d-axis and q-axis current command values indicating a current that is to be supplied to the brushless motor;

a control operating section that calculates d-axis and q-axis voltage command values indicating a voltage that is to be applied to the brushless motor, based on the d-axis and q-axis current command values decided by the command current setting section; and a driving section that drives the brushless motor based on the d-axis and q-axis voltage command values calculated by the control operating section, wherein the command current setting section decides the d-axis and q-axis current command values within a predetermined voltage limit value and a predetermined current limit value so that the d-axis and q-axis voltage command values and the d-axis and q-axis current command values satisfy both inequalities given as follows, $$\sqrt{(vd^2+vq^2)} \leq Vlim,$$

$$\sqrt{(id^2+iq^2)} \leq Ilim,$$

where vd is the d-axis voltage command value, vq is the q-axis voltage command value, Vlim is the voltage limit value, id is the d-axis current command value, iq is the q-axis current command value, and Ilim is the current limit value.

In a second invention according to the first invention, the command current setting section includes:

a target current setting section that sets a target current of the current to be supplied to the brushless motor; and a target value correcting section that calculates the d-axis and q-axis current command values by correcting d-axis and q-axis components of the target value so that the d-axis and q-axis voltage command values vd, vq satisfy a following equation with regard to the voltage limit value Vlim, when the voltage that is to be applied to the brushless motor to supply the current of the target value to the brushless motor exceeds the voltage limit value Vlim, $$\sqrt{(vd^2+vq^2)} = Vlim,$$

In a third invention according to the first or second invention, the command current setting section includes a reduction-in-torque compensating section that compensates the q-axis current command value so that a reduction in an output torque of the brushless motor caused by the d-axis current command value is compensated and both inequalities are satisfied, wherein the control operating section calculates the d-axis and q-axis voltage command values by using the d-axis current command value and the corrected q-axis current command value subjected to a correction by the reduction-in-torque compensating section.

In a fourth invention according to the third invention, the reduction-in-torque compensating section includes:

a first maximum value deciding section that calculates a maximum value, that is allowed for the q-axis current command value iq when the q-axis current command value iq is changed to satisfy an inequality indicating a limit given by the voltage limit value Vlim out of both inequalities, as a first maximum value;

a second maximum value deciding section that calculates another maximum value, that is allowed for the q-axis current command value iq when the q-axis current command value iq is changed to satisfy an inequality indicating a limit given by the current limit value Vlim out of both inequalities, as a second maximum value;

a correcting section that corrects the q-axis current command value so that a reduction in output torque of the brushless motor caused by the d-axis current command value is compensated; and a selecting section that selects a smallest value out of the q-axis current command value subjected to the correction by the correcting section, the first maximum value, and the second maximum value as the q-axis current command value subjected to the correction.

A fifth invention provides an electronic power steering apparatus for applying a steering assist force to a steering mechanism of a vehicle by a brushless motor, which includes the motor controller set forth in any one of the first to fourth inventions;

wherein the motor controller drives the brushless motor that applies the steering assist force to the steering mechanism.

Advantages of the Invention

According to the first invention, the d-axis and q-axis current command values are decided not to exceed not only the voltage limit but also the current limit. Therefore, a reduction in the motor torque in the high revolution range can be suppressed by the field weakening control, while avoiding the damage of the motor controller caused due to the event that the excessive current flows through the wirings, the switching elements, etc. in the driving section of the brushless motor, and the like.

According to the second invention, when the voltage applied to supply the current of the target value to the brushless motor exceeds the limit imposed by the voltage limit value, the voltage that is maximum in the limit range is applied to the brushless motor. Therefore, a reactive power of the brushless motor can be suppressed to the utmost.

According to the third invention, the q-axis current target value is corrected in the range that does not exceed the voltage limit and the current limit such that a reduction in the motor torque caused due to the d-axis current command value is compensated. Therefore, in addition to the similar advantages to the first or second invention, the stable motor output can be obtained up to the high revolution range even when the field weakening control is introduced.

According to the fourth invention, a smallest value out of the corrected q-axis current command value used to compensate a reduction in the motor torque, a maximum value of the q-axis current command value within the voltage limit range (first maximum value), and a maximum value of the q-axis current command value within the current limit range (second maximum value) is selected as the corrected q-axis current command value with respect to the d-axis current command value that is decided by the command current setting section, and then the d-axis and q-axis voltage command values are calculated by using the d-axis current command value and the corrected q-axis current command value. Therefore, the similar advantages to those in the third invention can be achieved.

According to the fifth invention, the d-axis and q-axis current command values that are supplied to the brushless motor to give the steering assist force are decided not to exceed not only the voltage limit but also the current limit. Therefore, a reduction in the motor torque in the high revolution range can be suppressed by the field weakening control, while avoiding the damage of the motor controller caused due to the excessive current.

Figure 1:
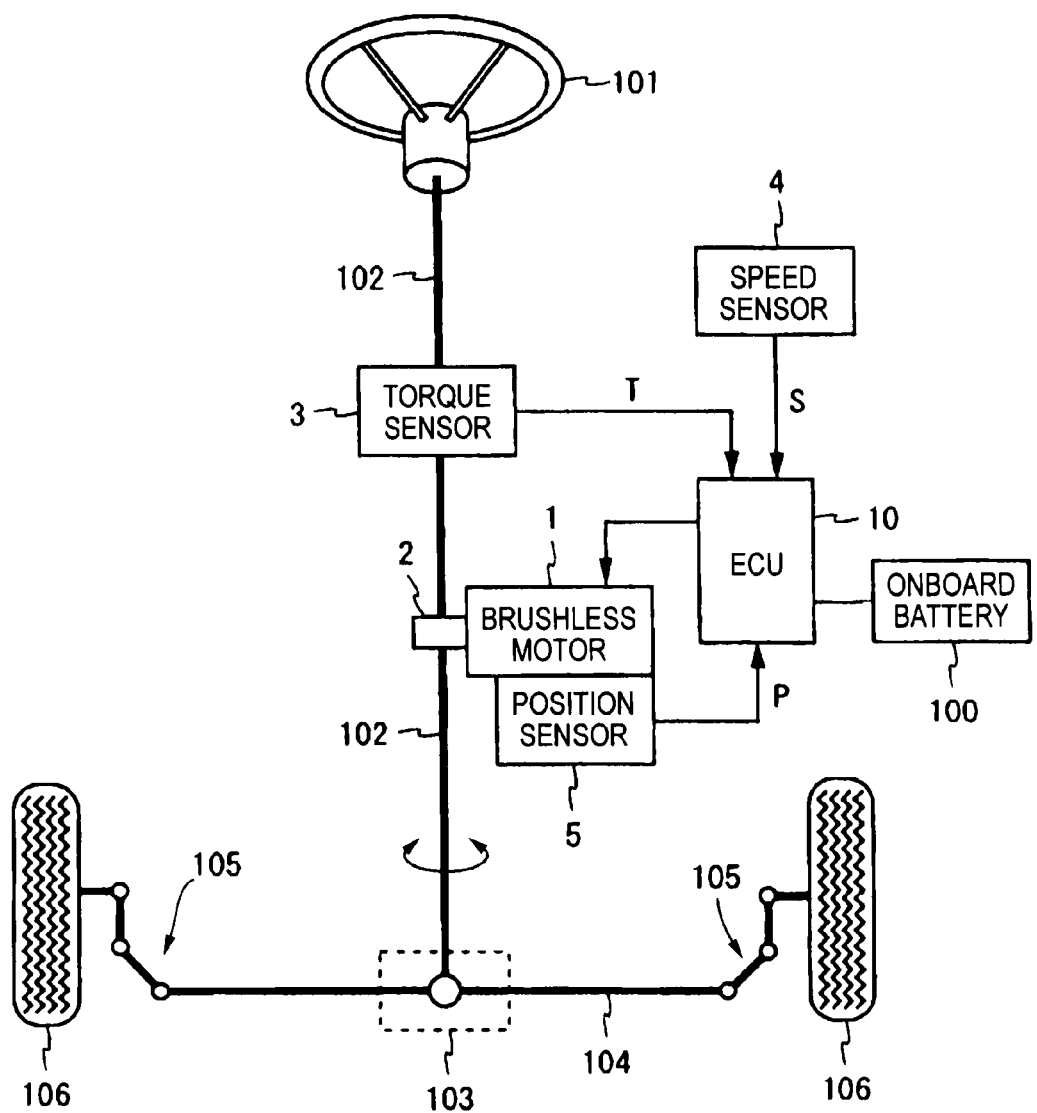
FIG. 1 is a block diagram showing a configuration of an electronic power steering apparatus according to embodiments of the present invention.

DESCRIPTION OF REFERENCE NUMERALS 6 rotor, 10 ECU, 13 motor driving circuit, 14 current sensor, 20 microcomputer, 22 d-axis current setting portion, 25 command current setting portion.

BEST MODE FOR CARRYING OUT THE INVENTION

1. Electronic Power Steering Apparatus

FIG. 1 is a schematic block diagram showing a configuration of an electronic power steering apparatus according to embodiments of the present invention, together with associated configurations of a vehicle. The electronic power steering apparatus shown in FIG. 1 is a column assist type electronic power steering apparatus that is equipped with a brushless motor 1, a reduction gear 2, a torque sensor 3, a speed sensor 4, a position sensor 5, and an electronic control unit (abbreviated as "ECU" hereinafter) 10.

As shown in FIG. 1, a steering wheel (handle) 101 is fixed to one end of a steering shaft 102, and the other end of the steering shaft 102 is coupled to a rack shaft 104 via a rack & pinion mechanism 103. Both ends of the rack shaft 104 are coupled to a wheel 106 via a coupling member 105 consisting of a tie-rod and a knuckle arm respectively. When a driver turns the steering wheel 101, the steering shaft 102 is turned and correspondingly the rack shaft 104 is moved reciprocally. The direction of the wheel 106 is changed according to a reciprocating motion of the rack shaft 104.

The electronic power steering apparatus executes the steering assist illustrated hereunder to reduce the load of the driver. The torque sensor 3 senses a steering torque T that is applied to the steering shaft 102 by the operation of the steering wheel 101. The speed sensor 4 senses a vehicle speed S. The position sensor 5 senses a turning position P of the rotor of the brushless motor 1. The position sensor 5 is composed of the resolver, for example.

The ECU 10 receives a supply of an electric power from an onboard battery 100, and drives the brushless motor 1 based on the steering torque T, the vehicle speed S, and the turning position P. The brushless motor 1 when driven by the ECU 10 produces a steering assist force. The reduction gear 2 is provided between the brushless motor 1 and the steering shaft 102. The steering assist force produced by the brushless motor 1 is applied via the reduction gear 2 to turn the steering shaft 102.

As a result, the steering shaft 102 is turned by both the steering torque applied to the steering wheel 101 and the steering assist force produced by the brushless motor 1. In this manner, the electronic power steering apparatus performs the steering assist by applying the steering assist force produced by the brushless motor 1 to the steering mechanism of the vehicle.

The electronic power steering apparatus according to the embodiments of the present invention is characterized by the controller (motor controller) that drives the brushless motor 1. Therefore, the motor controller contained in the electronic power steering apparatus according to the embodiments will be explained hereunder.

2. First Embodiment

2.1 Overall Configuration of Motor Control Unit

Figure 2:
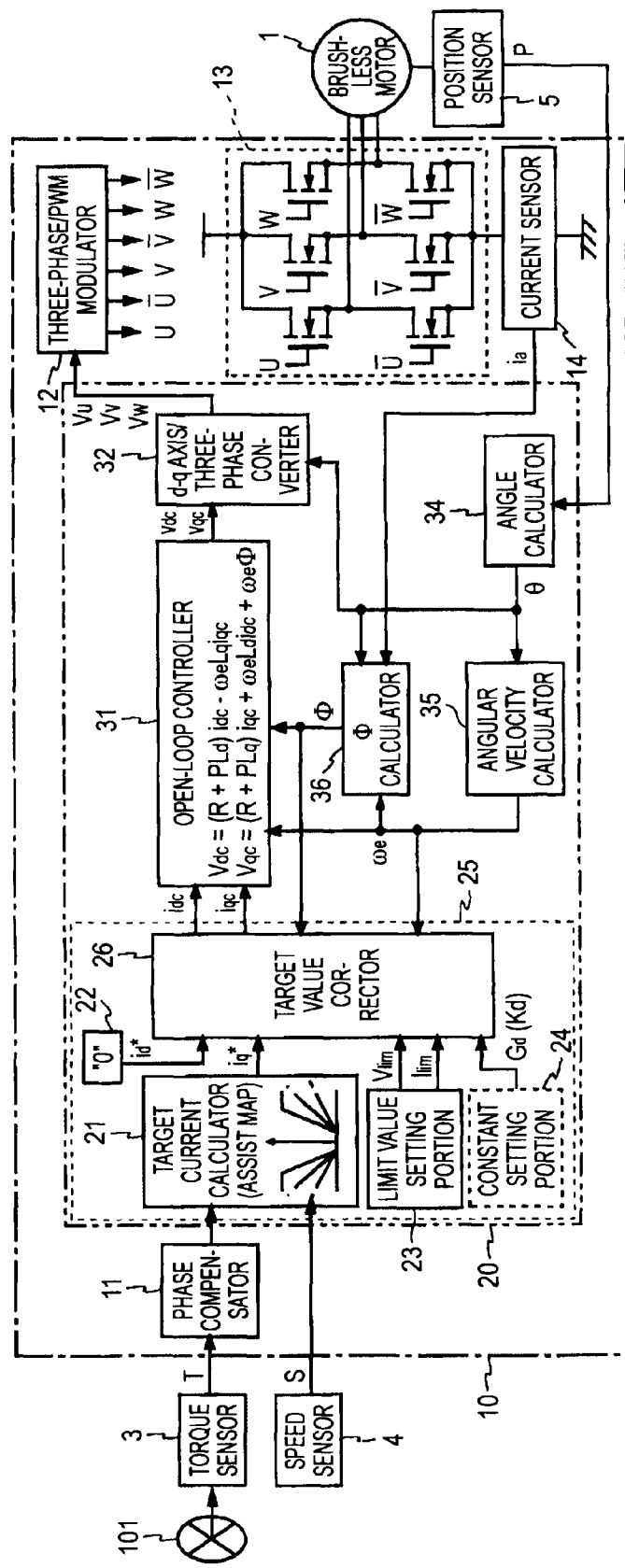
FIG. 2 is a block diagram showing a configuration of a motor controller according to a first embodiment of the present invention.

FIG. 2 is a block diagram showing a configuration of the motor controller according to a first embodiment of the present invention. The motor controller shown in FIG. 2 is constructed by using the ECU 10, and drives the brushless motor 1 with three-phase windings (not shown) in u-phase, v-phase, and w-phase. The ECU 10 is equipped with a phase compensator 11, a microcomputer 20, a three-phase/PWM (Pulse Width Modulation) modulator 12, a motor driving circuit 13, and a current sensor 14.

The steering torque T output from the torque sensor 3, the vehicle speed S output from the speed sensor 4, and the turning position P output from the position sensor 5 are input into the ECU 10. The phase compensator 11 applies a position compensation to the steering torque T. The microcomputer 20 functions as a controlling section for detecting a voltage command value used to drive the brushless motor 1. Details of functions of the microcomputer 20 will be described later.

The three-phase/PWM modulator 12 and the motor driving circuit 13 are constructed by hardware (circuit), and functions as a motor driving section for driving the brushless motor 1 by using a voltage of the voltage command value detected by the microcomputer 20. The three-phase/PWM modulator 12 produces three types of PWM signals (U, V, W shown in FIG. 2) that have a duty ratio to respond to three-phase voltage command value detected by the microcomputer 20. The motor driving circuit 13 is a PWM voltage type inverter circuit containing six MOS-FETs (Metal Oxide Semiconductor Field Effect Transistors) as the switching elements. Six MOS-FETs are controlled by three types of PWM signals and their negative signals. When the conduction states of MOS-FETs are controlled by using the PWM signals, three-phase driving currents (u-phase current, v-phase current, and w-phase current) are supplied to the brushless motor 1.

The current sensor 14 senses the current being flowing through the brushless motor 1. The current sensor 14 is composed of a resistor or a Hall element, for example, and only one current sensor 14 is provided between the motor driving circuit 13 and a power supply. In an example shown in FIG. 2, the current sensor 14 is provided between the motor driving circuit 13 and the minus side (GND) of the power supply. But the current sensor 14 may be provided between the motor driving circuit 13 and the plus side of the power supply.

The current value being detected by the current sensor 14 while the brushless motor 1 is turned is changed in response to the PWM signal. An area where one-phase driving current is detected by the current sensor 14 and an area where a sum of two-phase driving currents is detected exist in one period of the PWM signal. Since a sum of three-phase driving currents becomes zero, the remaining one-phase driving current can be detected based on a sum of two-phase driving currents. As a result, three-phase driving currents can be detected by using one current sensor 14 while the brushless motor 1 is turned. A current Ia detected by the current sensor 14 is input into the microcomputer 20.

When a program stored in a memory (not shown) built in the ECU 10 is executed, the microcomputer 20 functions as a target current calculator 21, a d-axis current setting portion 22, a limit value setting portion 23, a constant setting portion 24, a target value corrector 26, an open-loop controller 31, a d-q axis/three-phase converter 32, an angle calculator 34, an angular velocity calculator 35, and a Φ calculator 36. In this case, the target current calculator 21 and the d-axis current setting portion 22 constitute a target current setting section for setting a d-axis component and a q-axis component of the target value of the current that is to be supplied to the brushless motor 1. The target current calculator 21, the d-axis current setting portion 22, the limit value setting portion 23, the constant setting portion 24, and the target value corrector 26 constitutes a command current setting portion 25 that decides d-axis and q-axis current command values idc, iqc that are to be supplied to the brushless motor 1. Also, the open-loop controller 31, the d-q axis/three-phase converter 32, the angular velocity calculator 35, and the Φ calculator 36 constitutes a control operating section that detects phase voltage command values used to drive the brushless motor 1.

As explained hereinafter, the microcomputer 20 calculates a voltage command value indicating the voltage that is given to the motor driving circuit 13, in compliance with the motor circuit equations, based on the current command value indicating the currents to be supplied to the brushless motor 1 and an angular velocity of the rotor of the brushless motor 1.

Figure 3:
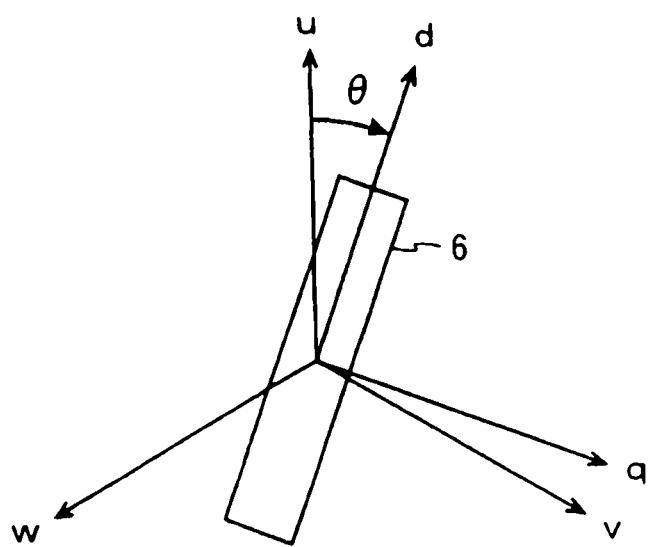
FIG. 3 is a view showing a three-phase AC coordinate and a d-q coordinate in a three-phase brushless motor.

The angle calculator 34 calculates an turning angle of the rotor of the brushless motor 1 (referred to as an "angle θ" hereinafter), based on the turning position P that the position sensor 5 detects. The angular velocity calculator 35 calculates an angular velocity ωe of the rotor of the brushless motor 1, based on the angle θ. In this case, as shown in FIG. 3, when a u-axis, a v-axis, and a w-axis are set to the brushless motor 1 and a d-axis and a q-axis are set to a rotor 6 of the brushless motor 1, an angle between the u-axis and the d-axis corresponds to the angle θ. That is, an electrical angle θ in the brushless motor 1 is calculated by the angle calculator 34.

The target current calculator 21 calculates a q-axis component of the target value of the current to be supplied to the brushless motor 1 (referred to as a "q-axis current target value" hereinafter), based on the steering torque T after the phase compensation (output signal of the phase compensator 11) and the velocity speed S. In more detail, the target current calculator 21 has a built-in table in which correspondences between the steering torque T and the target current are stored using the vehicle speed S as a parameter (referred to as an "assist map" hereinafter), and calculates a "q-axis current target value iq*" by referring to an assist map. When the steering torque is given to some extent, the q-axis current target value iq* indicating a q-axis component of the current, which is supplied to the brushless motor 1 to produce the steering assist force having an adequate magnitude in response to a magnitude of the steering torque, can be detected by using the assist map.

The d-axis current setting portion 22 outputs id*=0 as a d-axis component of the target value of the current to be supplied to the brushless motor 1 (referred to as a "d-axis current target value id*" hereinafter).

The limit value setting portion 23 outputs predetermined values as a voltage limit value Vlim and a current limit value Ilim. The voltage limit value Vlim is decided in response to a DC voltage supplied to the motor driving circuit 13 acting as an inverter, i.e., a voltage of the battery 100. The current limit value Ilim is decided based on tolerances of the currents, which flow through the wiring patterns and the switching elements of the driving circuit, etc., to prevent the damage of the motor controller.

The constant setting portion 24 outputs a d-axis current factor Gd and a current margin constant Kd, which are used to decide a d-axis current target value id# for the field-weakening controlling process. The d-axis current target value id# is decided by the d-axis current factor Gd and the current margin constant Kd such that the current flowing through the brushless motor 1 does not exceed the current limit value Ilim (details will be described later). Here, depending on the field-weakening controlling process in the target value corrector 26 described later, in some cases both the d-axis current factor Gd and the current margin constant Kd are not employed. In this case, the constant setting portion 24 is not needed.

The target value corrector 26 receives the q-axis current target value iq* from the target current calculator 21, the d-axis current target value id* (=0) from the d-axis current setting portion 22, the voltage limit value Vlim and the current limit value Ilim from the limit value setting portion 23, and the d-axis current factor Gd or the current margin constant Kd from the constant setting portion 24 respectively, and corrects the d-axis current target value id* and the q-axis current target value iq* based on the voltage limit value Vlim and the current limit value Ilim. Thus, the target value corrector 26 generates the d-axis current command value idc and the q-axis current command value iqc.

The open-loop controller 31 calculates a d-axis component and a q-axis component of the target value of the voltage that is to be applied to the brushless motor 1, based on the d-axis current command value idc, the q-axis current command value iqc, and the angular velocity ωe (the former value is referred to as a "d-axis voltage command value vdc" hereinafter, and the latter value is referred to as a "q-axis voltage command value vqc" hereinafter). The d-axis voltage command value vdc and the q-axis voltage command value vqc are calculated by using the motor circuit equations given by following equations (1) and (2).

$$vdc = (R + PLd)idc - \omega eLq\,iqc \quad (1)$$

$$vqc = (R + PLq)iqc + \omega eLd\,idc + \omega e\Phi \quad (2)$$

Where, in equations (1) and (2), ωe is the angular velocity, R is an armature winding resistance, Ld is a d-axis self-inductance Ld, Lq is a q-axis self-inductance, Φ is a $\sqrt{(2/3)}$ multiple of the maximum value of the armature winding flux linkage number in U, V, W phases, and P is a differential operator P. Out of them, R, Ld, Lq, and Φ are handled as the already-known parameters. Here, wiring resistances between the brushless motor 1 and the ECU 10, resistances and wiring resistances of the motor driving circuit 13 in the ECU 10, and the like are contained in the circuit resistance indicated by R.

The d-q axis/three-phase converter 32 converts the d-axis voltage command value vdc and the q-axis voltage command value vqc calculated by the open-loop controller 31 into the voltage command values on the three-phase AC coordinate axis. In more detail, the d-q axis/three-phase converter 32 calculates a u-phase voltage command value Vu, a v-phase voltage command value Vv, and a w-phase voltage command value Vw by using following equations (3) to (5), based on the d-axis voltage command value vdc and the q-axis voltage command value vqc.

$$Vu = \sqrt{(2/3)} \times \{vdc \times \cos\theta - vqc \times \sin\theta\} \quad (3)$$

$$Vv = \sqrt{(2/3)} \times \{vdc \times \cos(\theta - 2\pi/3) - vqc \times \sin(\theta - 2\pi/3)\} \quad (4)$$

$$Vw = -Vu - Vv \quad (5)$$

An angle θ contained in the above equations is an electrical angle calculated y the angle calculator 34. Here, the u-phase voltage command value Vu, the v-phase voltage command value Vv, and the w-phase voltage command value Vw are mentioned generically as "phase voltage command values Vu, Vv, Vw".

In this fashion, the phase voltage command values Vu, Vv, Vw obtained by the d-q axis/three-phase converter 32 are output from the microcomputer 20, and are given to the three-phase/PWM modulator 12. The three-phase/PWM modulator 12 outputs three types of PWM signals based on these phase voltage command values Vu, Vv, Vw. Accordingly, sinusoidal currents flow through the three-phase windings of the brushless motor 1 in response to respective phase voltage command values Vu, Vv, Vw, and the rotor of the brushless motor 1 is turned. Correspondingly a torque that responds to the current flowing through the brushless motor 1 is generated on the rotary shaft of the brushless motor 1. The generated torque is employed in the steering assist.

A current value Ia detected by the current sensor 14, the electrical angle θ calculated by the angle calculator 34, and the angular velocity ωe calculated by the angular velocity calculator 35 are input into the Φ calculator 36. The Φ calculator 36 calculates first the u-phase and v-phase current values flowing through the brushless motor 1, i.e., a u-phase current detected value Iu and a v-phase current detected value Iv, based on the current value Ia and then calculates a d-axis current detected value id and a q-axis current detected value iq by converting them into the current values on the d-q coordinate axes by using following equations (6) and (7).

$$id=\sqrt{2} \times \{Iv \times \sin\theta - Iu \times \sin(\theta - 2\pi/3)\} \quad (6)$$

$$iq=\sqrt{2} \times \{Iv \times \cos\theta - Iu \times \cos(\theta - 2\pi/3)\} \quad (7)$$

Then, when the angular velocity ωe≠0, the Φ calculator 36 calculates the armature winding flux linkage number Φ contained in the equation (2) by using a following equation (8), based on the q-axis voltage command value vqc, the d-axis current detected value id, the q-axis current detected value iq, and the angular velocity ωe.

$$\Phi = \{vqc - (R+PLq)iq - \omega eLdid\}/\omega e \quad (8)$$

Here, this equation (8) is derived by substituting the d-axis current detected value id and the q-axis current detected value iq into the d-axis current command value idc and the q-axis current command value iqc in the equation (2) and then solving the equation with respect to Φ.

The Φ calculator 36 outputs the calculated flux linkage number Φ to the open-loop controller 31 and the target value corrector 26. The open-loop controller 31 employs the flux linkage number Φ calculated by the Φ calculator 36 when it calculates the q-axis voltage command value vqc by using the equation (2). In this manner, the microcomputer 20 calculates the armature winding flux linkage number Φ contained in the motor circuit equations, and employs this Φ value in calculating the q-axis voltage command value vqc. In this event, the Φ calculator 36 may be omitted, and a value decided previously as the Φ value may be employed.

The Φ calculator 36 may calculate the D value at any timing as far as the angular velocity ωe≠0 is continued. Also, the Φ calculator 36 may calculate the Φ value at a predetermined time interval, may calculate the Φ value only once after the driving of the brushless motor 1 is started, or may calculate the Φ value when a state such as a temperature, or the like is changed, for example. Also, since an error is easily generated in the Φ value that is calculated when the angular velocity ωe is close to zero, the D calculator 36 may calculate the ω value only when the angular velocity ωe is in excess of a predetermined threshold value.

As described above, the motor controller according to the present embodiment derives the voltage command value by the open-loop control in compliance with the motor circuit equations based on the current command value and the angular velocity of the rotor, then calculates the ω value contained in the motor circuit equations based on the current value detected by the current sensor, and then employs this Φ value when the voltage command value is calculated. As a result, according to the motor controller according to the present embodiment, even when the Φ value contained in the motor circuit equations is varied due to a manufacturing variation or a temperature change, the brushless motor can be driven with high accuracy and thus a desired motor output can be obtained.

In the present embodiment, the armature winding resistance R, etc. used in the open-loop controller 31 to calculate the d-axis voltage command value vdc and the q-axis voltage command value vqc are treated as the already-known parameters, nevertheless the Φ value may be corrected adequately by the Φ calculator 36 as a parameter calculating section while treating the Φ value as the already-known parameter. However, the present invention is not limited to such configuration. An R calculating portion may be provided as a parameter calculating section instead of the Φ calculator 36 or together with the Φ calculator 36, and the armature winding resistance R calculated by this R calculating portion may be used upon calculating the d-axis voltage command value vdc and the q-axis voltage command value vqc. Also, respective parameters used to calculate the d-axis voltage command value vdc and the q-axis voltage command value vqc may be treated as fixed values or calculated values based on the current command value, and the current sensor 14 may be omitted. Here, when the R calculating portion is provided, this R calculating portion calculates the armature winding resistance R contained in the equations (1) and (2) by using a following equation, based on the q-axis voltage command value vqc, the d-axis current detected value id, the q-axis current detected value iq, and the angular velocity ωe when iq≠0, for example.

$$R=(vqc-PLqiq-\omega eLdid-\omega e\Phi)/iq \quad (10)$$

2.2 Details of Target Correcting Portion

Then, various configurative examples of the target value corrector 26 in the present embodiment will be explained in detail hereunder. The target value corrector 26 in the present embodiment is implemented when the microcomputer 20 executes the target value correcting process based on a predetermined program.

2.2.1 First Configurative Example

Figure 4:
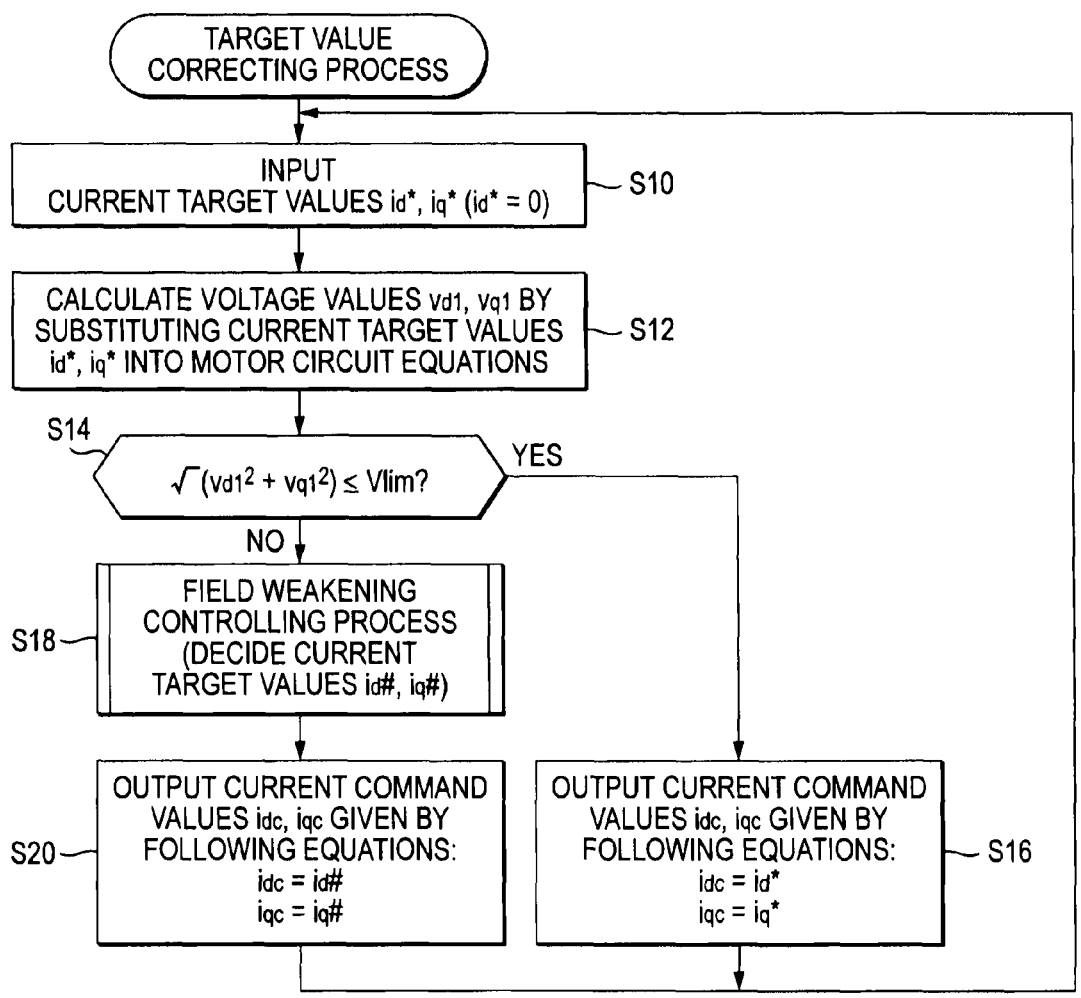
FIG. 4(a) is a flowchart showing a target value correcting process executed by a first configurative example of a target value correcting portion in the first embodiment.
FIG. 4(b) is a flowchart showing a field-weakening controlling process executed by a first configurative example of a target value correcting portion in the first embodiment.
Figure 4:
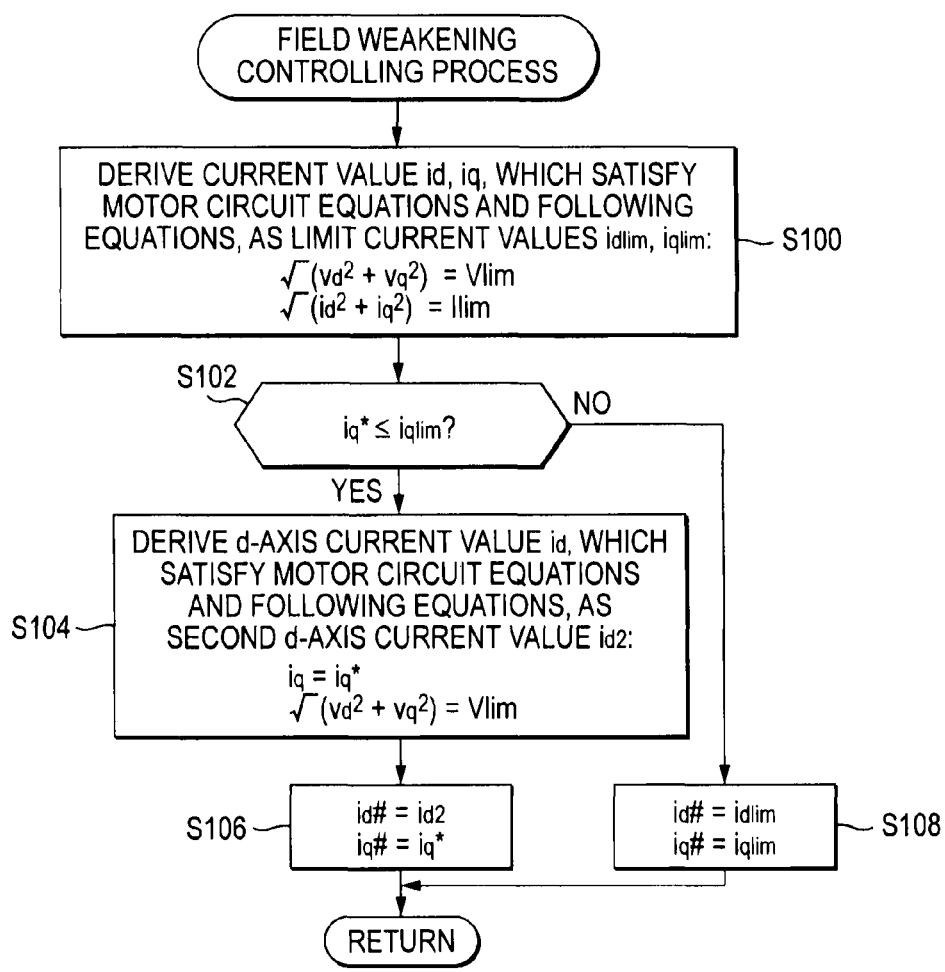

FIG. 4 is a flowchart showing the target value correcting process that the microcomputer 20 executes to implement the target value correcting portion 26 in the first embodiment. An operation of the target value correcting portion 26 in this first configurative example will be explained with reference to FIG. 4 hereunder. In this first configurative example, the constant setting portion 24 is not needed.

First, the target value correcting portion 26 receives the q-axis current target value iq* from the target current calculator 21, and receives the d-axis current target value id* from the d-axis current setting portion 22 (S10). Then, the target value correcting portion 26 calculates d-axis and q-axis voltage values vd, vq, which are obtained by substituting the current target values id=id*, iq=iq* into the motor circuit equations, as first d-axis and q-axis voltage values vd1, vq1 (S12).

$$vd=(R+PLd)id-\omega eLqiq \quad (11)$$

$$vq=(R+PLq)iq+\omega eLdid+\omega e\Phi \quad (12)$$

Where ωe is the angular velocity of the rotor, R is the armature winding resistance, Ld is the d-axis self-inductance, Lq is the q-axis self-inductance, Φ is the √(⅔) multiple of the maximum value of the armature winding flux linkage number in U, V, W phases, and P is the differential operator P. In this case, the angular velocity ωe is input from the angular velocity calculator 35, and the armature winding flux linkage number Φ is input from the Φ calculator 36.

Then, the target value correcting portion 26 decides whether or not the first d-axis and q-axis voltage values vd1, vq1 exceed the voltage limit (S14). That is, the target value correcting portion 26 decides that the first d-axis and q-axis voltage values vd1, vq1 do not exceed the voltage limit when these voltage values satisfy the following equation, and decides that the first d-axis and q-axis voltage values vd1, vq1 exceed the voltage limit when these voltage values do not satisfy the following equation.

$$\sqrt{(vd1^2+vq1^2)} \leq Vlim \quad (13)$$

Where Vlim is the voltage limit value that is input from the limit value setting portion 23.

As the result of decision in step S14, when the first d-axis and q-axis voltage values vd1, vq1 do not exceed the voltage limit, the target value correcting portion 26 outputs the d-axis and q-axis input current target values id*, iq* as the current command values idc, iqc (S16). That is, the d-axis and q-axis current command values to be given to the open-loop controller 31 are set as idc=id*, iqc=iq*.

As the result of decision in step S14, when the first d-axis and q-axis voltage values vd1, vq1 exceed the voltage limit, the target value correcting portion 26 executed the field weakening controlling process shown in FIG. 4(b)(S18).

Figure 5:
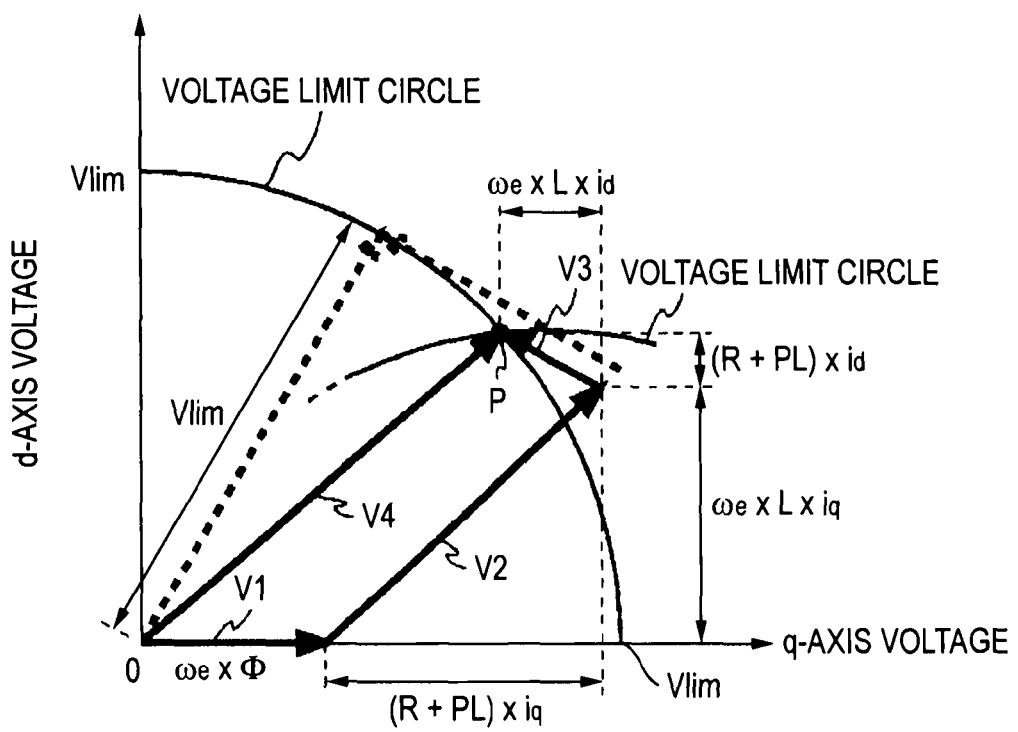
FIG. 5 is a vector diagram explaining how to derive d-axis and q-axis current command values based on the field-weakening controlling process executed by the first configurative example.

In this field weakening controlling process, first the target value correcting portion 26 derive d-axis and q-axis current values id, iq, which satisfy the motor circuit equations (11)(12) and following equations (14)(15), as d-axis and q-axis limit current values idlim, iqlim respectively (S100).

$$\sqrt{(vd^2+vq^2)}=Vlim \quad (14)$$

$$\sqrt{(id^2+iq^2)}=Ilim \quad (15)$$

Where Vlim is the voltage limit value being input from the limit value setting portion 23, and Ilim is the current limit value being input from the limit value setting portion 23. When the currents having such d-axis and q-axis limit current values idlim, iqlim flow through the brushless motor 1, a voltage vector V1 produced by a back electromotive force ωeΦ, a voltage vector V2 produced by the q-axis current iq, and a voltage vector V3 produced by the d-axis current id have the relation shown in a vector diagram of FIG. 5. That is, when a start point of a synthesis voltage vector V4 consisting of the voltage vector V1, the voltage vector V2, and the voltage vector V3 is put on an origin on a plane that is defined by the d-axis and the q-axis both indicating the voltage, an end point of the synthesis voltage vector V4 is given as an intersection point between a voltage limit circle indicated by the equation (14) and a current limit circle indicated by the equation (15).

Then, the target value correcting portion 26 decides whether or not the q-axis current target value iq* is less than the q-axis limit current value iqlim (S102).

As the result of decision in step S14, when the q-axis current target value iq* is less than the q-axis limit current value iqlim, the target value correcting portion 26 derives the d-axis current value id, which satisfies the motor circuit equations (11)(12) and following equations (16)(17), as a second d-axis current value id2 (S104)

$$iq=iq^* \quad (16)$$

$$\sqrt{(vd^2+vq^2)}=Vlim \quad (17)$$

In this case, the target value correcting portion 26 sets the second d-axis current value id2 and the q-axis current target value iq* as the d-axis current target value id# and the q-axis current target value iq# in the field-weakening controlling process respectively (S106). Then, the process is returned from the field weakening controlling process, and goes to the target value correcting process in step S20.

As the result of decision in step S102, when the q-axis current target value iq* exceeds the q-axis limit current value iqlim, the target value correcting portion 26 sets the d-axis and q-axis limit current values idlim, iqlim as the d-axis current target value id# and the q-axis current target value iq# in the field-weakening controlling process respectively (S108). Then, the process is returned from the field weakening controlling process, and goes to the target value correcting process in step S20.

In the target value correcting process in step S20, the target value correcting portion 26 outputs the d-axis current target value id# and the q-axis current target value iq# in the field weakening controlling process, as calculated above, as the d-axis and q-axis current command values idc, iqc (S20). That is, the d-axis and q-axis current command values to be supplied to the open-loop controller 31 are set as idc=id#, iqc=iq#.

After the d-axis and q-axis current command values idc, iqc are output, the process goes back to step S20, and subsequently the similar processes to the above are repeated. Accordingly, the d-axis and q-axis current command values idc, iqc that do not exceed the voltage limit and the current limit are calculated based on the these current target values and output every time when the d-axis and q-axis current command values idc, iqc are input.

According to the first configurative example, the current command values idc, iqc and the voltage command values vdc, vqc, which are set in response to the current target values id*, iq* as large as possible within the range in which they do not exceed the voltage limit and the current limit, can be obtained by the field weakening control. However, the calculating load imposed to calculate the d-axis and q-axis current values id, iq, which satisfy the motor circuit equations (11)(12) and the above equations (14)(15), in the field weakening controlling process is heavy for the microcomputer 20. For this reason, second and third configurative examples will be explained as configurative examples of the target value corrector 26, in which the calculating load is not excessively imposed on the microcomputer 20, hereunder.

2.2.2 Second Configurative Example

In a second configurative example of the target value corrector 26, unlike the first configurative example, the constant setting portion 24 for outputting the d-axis current factor Gd is employed. This d-axis current factor Gd has a previously decided value in a range of 0<Gd<1, and is used to decide the d-axis current target value id# for the field weakening controlling process, as described later.

The target value correcting process according to the present configurative example is basically similar to the target value correcting process according to the first configurative example, and is given as shown in FIG. 4(a). But the contents of the field weakening controlling process as the routine that is called from the target value correcting process are different from those in the first configurative example.

Figure 6:
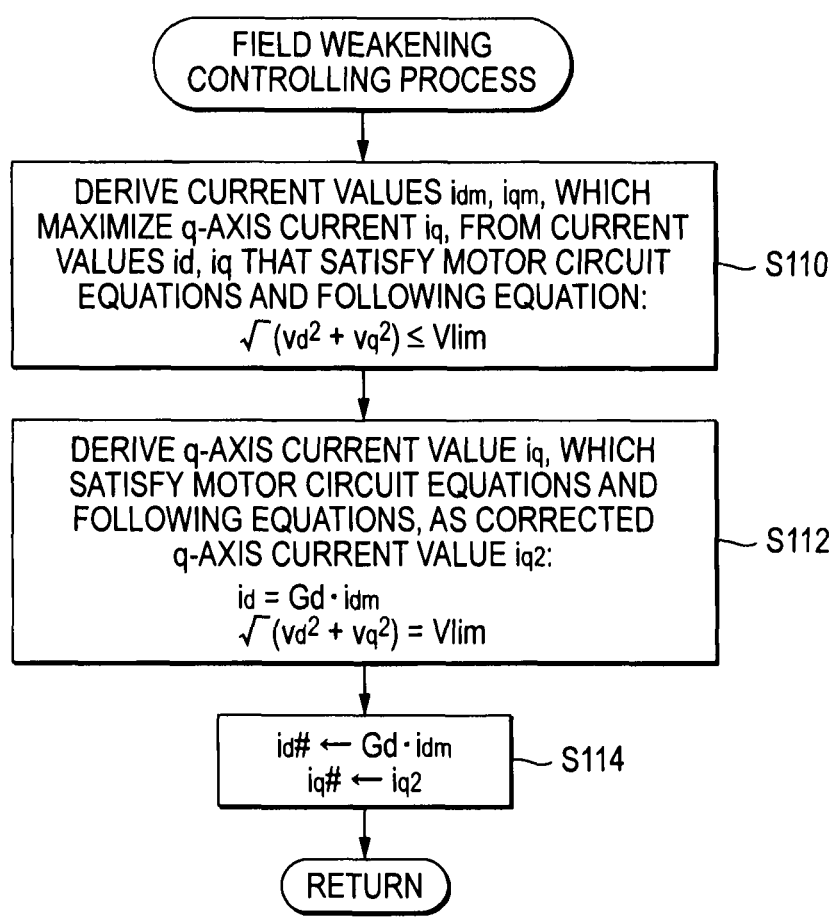
FIG. 6 is a flowchart showing a field-weakening controlling process by a second configurative example of the target value correcting portion in the first embodiment.
Figure 7:
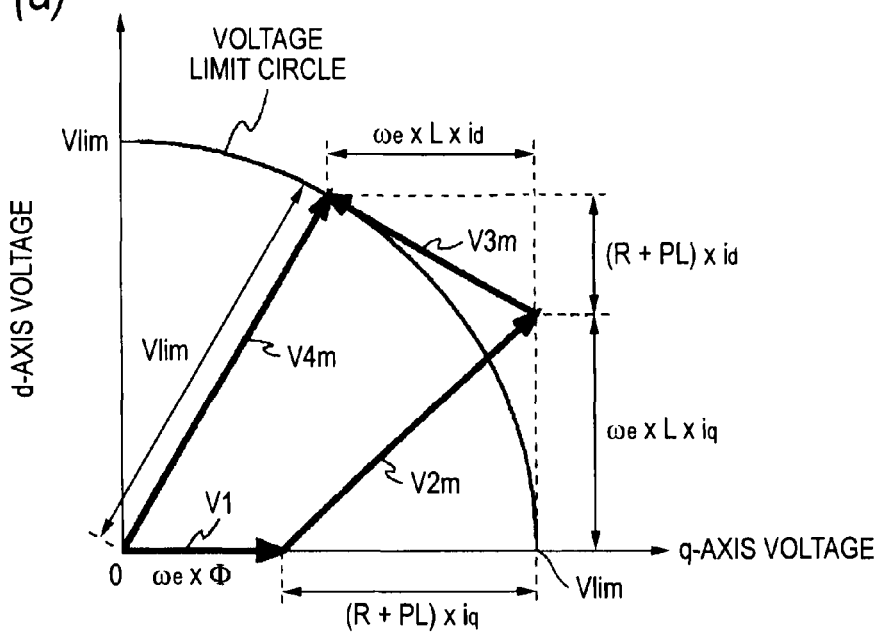
FIG. 7(a) is a vector diagram explaining how to derive d-axis and q-axis current command values based on the field-weakening controlling process executed by the second configurative example.
FIG. 7(b) is a vector diagram explaining how to derive d-axis and q-axis current command values based on the field-weakening controlling process executed by the second configurative example.
Figure 7:
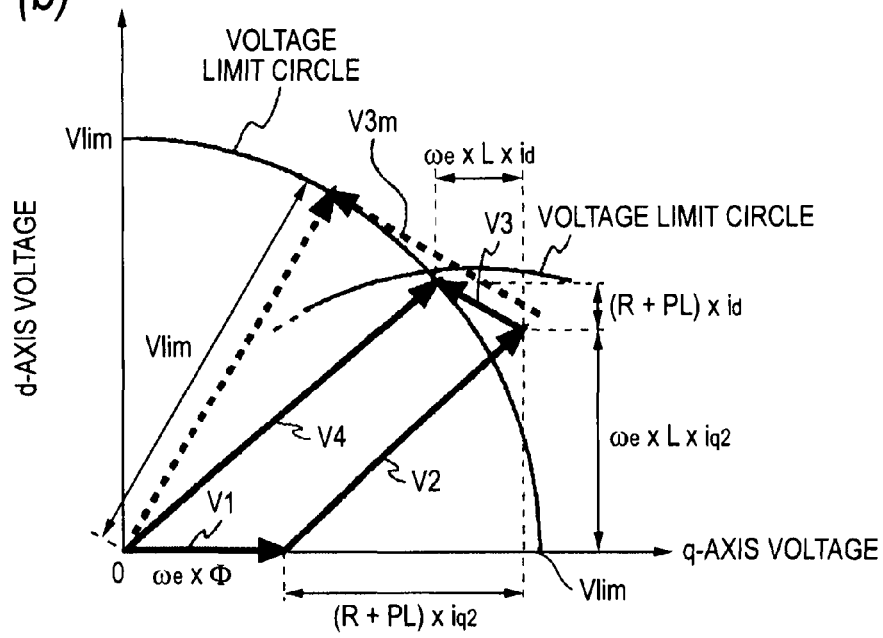

FIG. 6 is a flowchart showing the field-weakening controlling process executed by the present configurative example, and FIG. 7 is a vector diagram explaining how to derive d-axis and q-axis current command values based on the field-weakening controlling process. In the present configurative example, like the first configurative example, when it is decided that the first d-axis and q-axis voltage value vd1, vq1 obtained by substituting id=id*, iq=iq* into the motor circuit equations (11)(12) exceed the voltage limit given by the equation (13), the field-weakening controlling process is executed (steps S14, S18 in FIG. 4). Then, an operation of the target value correcting portion 26 applied to the field weakening controlling process according to the present configurative example will be explained with reference to FIG. 6 and FIG. 7 hereunder.

In the field weakening controlling process according to the present configurative example, first the target value corrector 26 derives the d-axis and q-axis current values, which can maximize the q-axis current value, out of the d-axis and q-axis current values id, iq that satisfy the motor circuit equations (11)(12) and a following equation (18), as maximum d-axis and q-axis current values idm, iqm (S110).

$$\sqrt{(vd^2+vq^2)} \leq Vlim \qquad (18)$$

Where Vlim is the voltage limit value being input from the limit value setting portion 23. When the currents of such maximum d-axis and q-axis current values idm, iqm flow through the brushless motor 1, the voltage vector V1 produced by the back electromotive force ωeΦ, a voltage vector V2m produced by the q-axis current iq, and a voltage vector V3m produced by the d-axis current id have the relation shown in a vector diagram of FIG. 7(a). That is, when a start point of a synthesis voltage vector V4m consisting of the voltage vector V1, the voltage vector V2m, and the voltage vector V3m is put on an origin on the plane that is defined by the d-axis and the q-axis both indicating the voltage, an end point of the synthesis voltage vector V4m is positioned on a voltage limit circle corresponding to the equation (18), and the voltage vector V3m comes in contact with the voltage limit circle.

Then, the target value correcting portion 26 derives the q-axis current value iq, which satisfy the motor circuit equations (11)(12) and following equations (19)(20), as a corrected q-axis current value iq2 (S112).

$$id = Gd \cdot idm \qquad (19)$$

$$\sqrt{(vd^2+vq^2)} = Vlim \qquad (20)$$

Where Gd is the d-axis current factor being input from the constant setting portion 24 (0<Gd<1). Also, the d-axis current value id given by the equation (19) is called the "corrected d-axis current value".

When the currents indicated by the corrected q-axis current value iq2 and a corrected d-axis current value Gd·idm flow through the brushless motor 1, the voltage vector V1 produced by the back electromotive force ωeΦ, the voltage vector V2 produced by the q-axis current iq, and the voltage vector V3 produced by the d-axis current id have the relation shown in a vector diagram of FIG. 7(b). Then, when the value of the d-axis current factor Gd is set adequately set, the d-axis and q-axis current values id, iq corresponding to these voltage vector V2, V3 satisfy the following equation indicating the current limit.

$$\sqrt{(id^2+iq^2)} \leq Ilim \qquad (21)$$

That is, when a start point of the synthesis voltage vector V4m consisting of the voltage vector V1 produced by the back electromotive force ωeΦ, the voltage vector V2 produced by the q-axis current iq, and the voltage vector V3 produced by the q-axis current id is put on an origin on the plane that is defined by the d-axis and the q-axis both indicating the voltage, an end point of the synthesis voltage vector V4 is positioned on the voltage limit circle corresponding to the equation (18) within the current limit circle corresponding to the equation (21). In this case, a concrete value of the d-axis current factor Gd is set previously to satisfy the equation (21) of the current limit, based on the design values of the motor controller and the brushless motor 1, the computer simulation or the experiment, and the like.

Then, the target value corrector 26 sets the corrected d-axis current value Gd·idm and the corrected q-axis current value iq2, which are derived as above, as the d-axis current target value id# and the q-axis current target value iq# in the field weakening control respectively (S114). Then, the process is returned from the field weakening controlling process, and goes to step S20 in FIG. 4. The subsequent processes are similar to the target value correcting process in the first configurative example.

2.2.3 Third Configurative Example

Next, a third configurative example of the target value correcting portion 26 will be explained hereunder. In the present configurative example, unlike the first configurative example, the constant setting portion 24 for outputting the current margin constant Kd is used. This current margin constant Kd is used to decide the d-axis current target value id# for the field weakening controlling process, as described later.

The target value correcting process according to the present configurative example is basically similar to the target value correcting process in the first configurative example, and is give as shown in FIG. 4(a). But the contents of the field-weakening controlling process as the routine that is called from the target value correcting process are different from those in the first configurative example.

Figure 8:
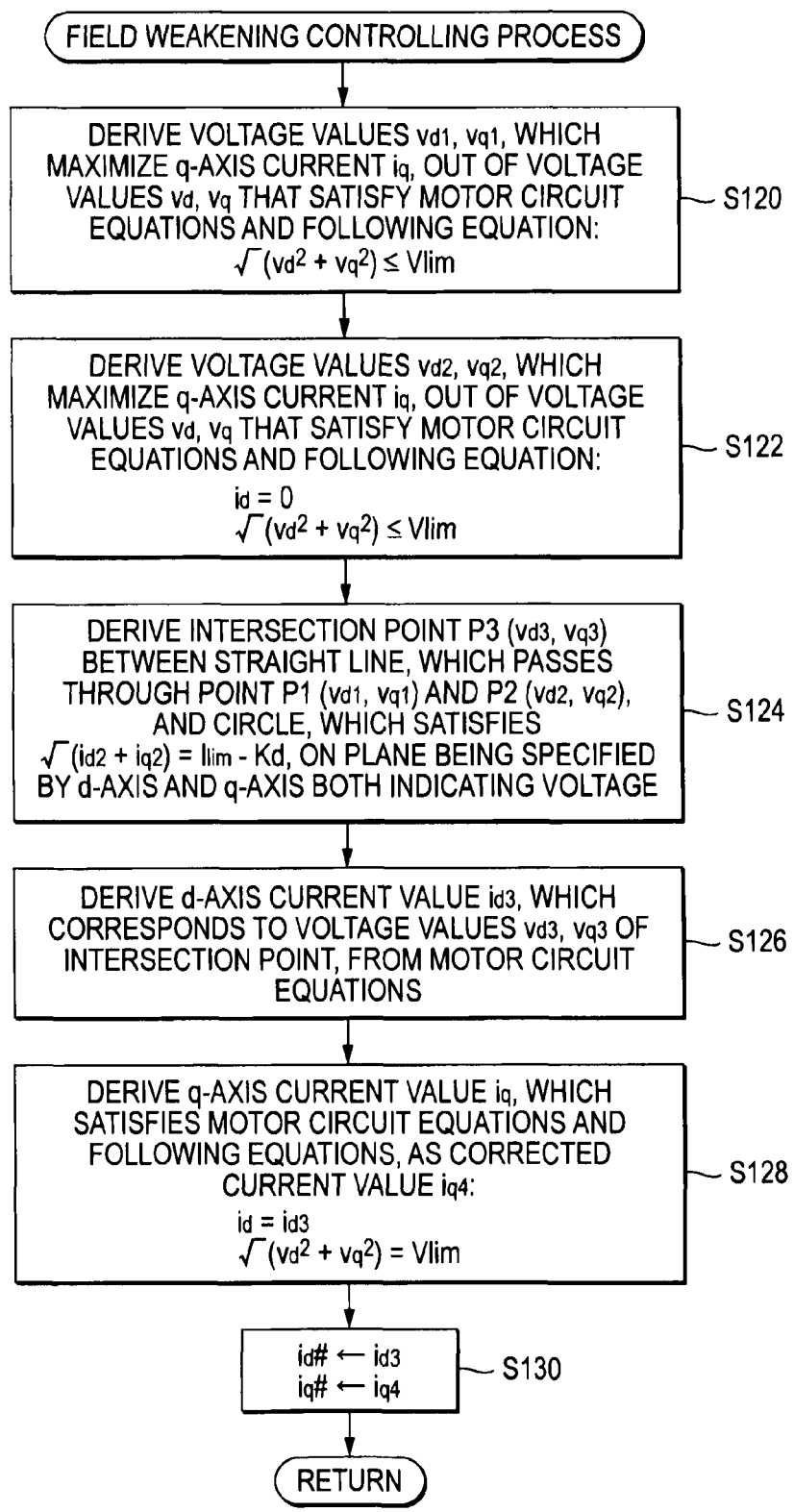
FIG. 8 is a flowchart showing a field-weakening controlling process by a third configurative example of the target value correcting portion in the first embodiment.
Figure 9:
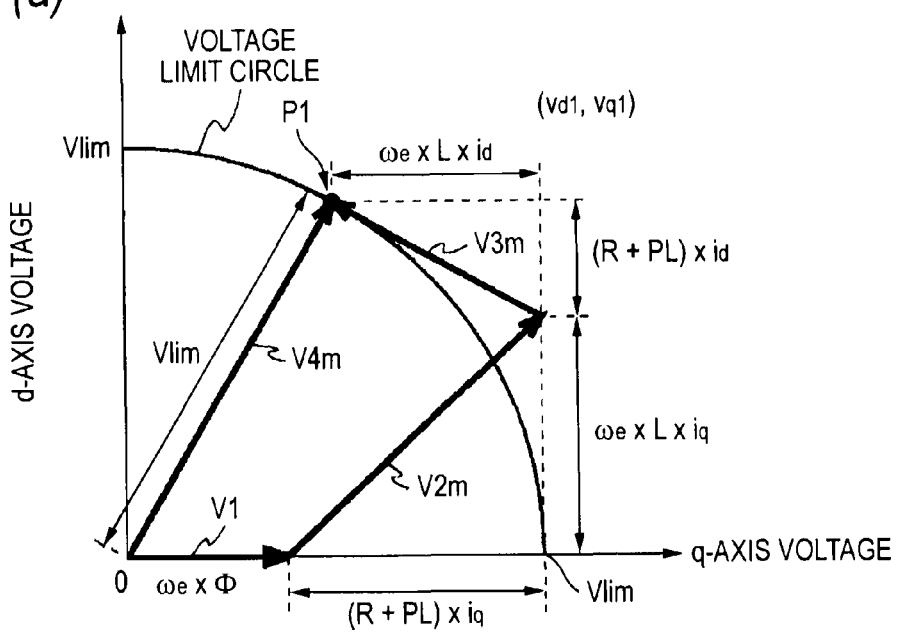
FIG. 9(a) is a vector diagram explaining how to derive d-axis and q-axis current command values based on the field-weakening controlling process executed by the third configurative example.
FIG. 9(b) is a vector diagram explaining how to derive d-axis and q-axis current command values based on the field-weakening controlling process executed by the third configurative example.
Figure 9:
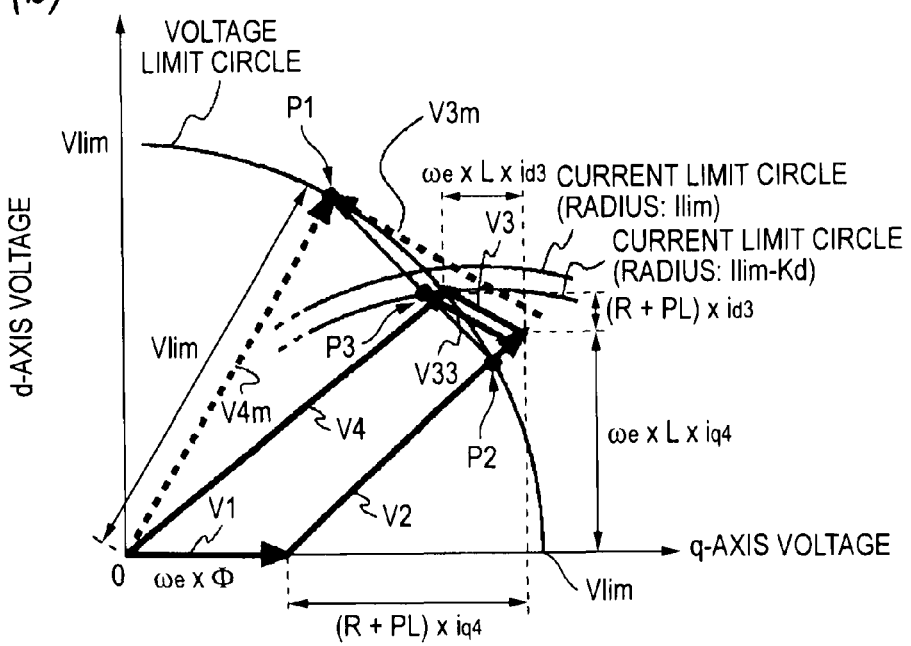

FIG. 8 is a flowchart showing the field-weakening controlling process in the present configurative example, and FIG. 9 is a vector diagram explaining how to derive the d-axis and q-axis current command values based on the field-weakening controlling process. In the present configurative example, like the first configurative example, when it is decided that the first d-axis and q-axis voltage value vd1, vq1 obtained by substituting id=id*, iq=iq* into the motor circuit equations (11)(12) exceed the voltage limit given by the equation (13), the field-weakening controlling process is executed (steps S14, S18 in FIG. 4). Then, an operation of the target value correcting portion 26 applied to the field-weakening controlling process according to the present configurative example will be explained with reference to FIG. 8 and FIG. 9 hereunder.

In the field weakening controlling process according to the present configurative example, like the case of the second configurative example, first the target value corrector 26 derives the d-axis and q-axis voltage values, which maximize the q-axis current iq, out of the d-axis and q-axis voltage values vd, vq that satisfy the motor circuit equations (11)(12) and following equation (22), as the first d-axis and q-axis voltage values vd1, vq1, (S120).

$$\sqrt{(vd^2+vq^2)} \leq Vlim \qquad (22)$$

When the voltages of the first d-axis and q-axis voltage values vd1, vq1 are applied to the brushless motor 1, the voltage vector V1 produced by the back electromotive force ωeΦ, the voltage vector V2m produced by the q-axis current iq, and the voltage vector V3m produced by the d-axis current id have the relation shown in a vector diagram of FIG. 9(a). A point (vd1, vq1) corresponding to the first d-axis and q-axis voltage values vd1, vq1 is given as a contact point P1 between the voltage vector V3m and the voltage limit circle.

Then, the target value corrector 26 derives the d-axis and q-axis voltage values, which maximize the q-axis current iq, out of the d-axis and q-axis voltage values vd, vq that satisfy the motor circuit equations (11)(12) and following equations (23)(24), as second d-axis and q-axis voltage value vd2, vq2 (S122).

$$id = 0 \quad (23)$$

$$\sqrt{(vd^2 + vq^2)} = Vlim \quad (24)$$

As shown in FIG. 9(b), a point (vd2, vq2) corresponding to the second d-axis and q-axis voltage values vd2, vq2 is given as an intersection point P2 between the voltage vector V2 produced by the q-axis current and the voltage limit circle.

Then, the target value corrector 26 derives the d-axis and q-axis voltage values corresponding to an intersection point P3 (vd3, vq3) between a straight line, which passes through the point P1 (vd1, vq1) and the point P2 (vd2, vq2), and a circle given by a following equation (25), on the plane (FIG. 9(b)) being specified by the d-axis and the q-axis both indicating a voltage, as third d-axis and q-axis voltage values vd3, vq3 (S124).

$$\sqrt{(id^2 + iq^2)} = Ilim - Kd \quad (25)$$

Where Ilim is the current limit value being input from the limit value setting portion 23, and Kd is the current margin constant being input from the constant setting portion 24 (Kd>0).

Then, the target value corrector 26 derives the d-axis current value id, which is obtained from the motor circuit equations (11)(12) when the third d-axis and q-axis voltage values vd3, vq3 are applied to the brushless motor 1, as a d-axis current value id3 (S126). A voltage vector V33 shown in FIG. 9(b) is the voltage vector produced by the third d-axis current value id3.

Then, the target value corrector 26 derives the q-axis current value, which satisfies the motor circuit equations (11) (12) and following equations (26)(27), as a corrected current value iq4 (S128).

$$id = id3 \quad (26)$$

$$\sqrt{(vd^2 + vq^2)} = Vlim \quad (27)$$

Where the d-axis current value given by the equation (26) is called the "corrected q-axis current value".

When the currents given by the corrected d-axis current value iq3 and the corrected d-axis current value iq4 flow through the brushless motor 1, the voltage vector V1 produced by the back electromotive force ωeΦ, the voltage vector V2 produced by the corrected q-axis current iq4, and the voltage vector V3 produced by the d-axis current id have the relation shown in the vector diagram of FIG. 9(b). Then, when the value of the current margin constant Kd is set adequately in advance, the d-axis and q-axis currents id, iq corresponding to these voltage vectors V2, V3 satisfy a following equation.

$$\sqrt{(id^2 + iq^2)} \leq Ilim \quad (28)$$

That is, when a start point of the synthesis vector V4 consisting of the voltage vector V1 produced by the back electromotive force ωeΦ, the voltage vector V2 produced by the corrected q-axis current iq4, and the voltage vector V3 produced by the corrected d-axis current value iq3 is put on an origin on the plane that is defined by the d-axis and the q-axis both indicating the voltage, an end point of the synthesis vector V4 is positioned on the voltage limit circle given by the equation (27) within the current limit circle corresponding to the equation (28). In this case, a concrete value of the current margin constant Kd is set previously to satisfy the equation (28) of the current limit, based on the design values of the motor controller and the brushless motor 1, the computer simulation or the experiment, and the like.

Then, the target value corrector 26 sets the corrected d-axis current value iq3 and the corrected d-axis current value iq4, which are derived as above, as the d-axis current target value id# and the q-axis current target value iq# in the field weakening control respectively (S130). Then, the process is returned from the routine of the field weakening controlling process, and goes to step S20 in FIG. 4. The subsequent processes are similar to those in the target value correcting process in the first configurative example.

2.3 Advantages

In the present embodiment, the d-axis and q-axis current command values idc, iqc are obtained by the target value correcting process containing the field weakening controlling process in the first, second, and third configurative examples, and the driving of the brushless motor 1 is controlled by the open-loop controller 31, etc. by using the d-axis and q-axis current command values idc, iqc. According to such present embodiment, as can be seen from FIG. 5, FIG. 7(b) and FIG. 9(b), the d-axis and q-axis current command values idc, iqc can be set by the field weakening control (id≠0) such that the substantially maximum q-axis current can be supplied in the range that does not exceed not only the voltage limit but also the current limit. That is, the motor torque that is maximum substantially in the voltage limit and the current limit ($\sqrt{(vd2+vq2)} \leq Vlim$ and $\sqrt{(id2+iq2)} \leq Ilim$) can be produced. As a result, a reduction in the motor torque in the high revolution range can be suppressed while avoiding the damage of the motor controller caused due to the event that the excessive current flows through the wirings, the switching elements, etc. in the driving circuit, and the like. Also, in any one of the first to third configurative examples, a reactive power can be suppressed to the utmost by applying the maximum voltage, which responds to the current target value within the range of the voltage limit, to the brushless motor 1 (FIG. 5, FIG. 7(b) and FIG. 9(b)). In the case of the first configurative example, the maximum current that responds to the current target value within the range of the current limit can also be supplied to the brushless motor 1. However, as already described, the second and third configurative examples are advantageous in the aspect of the operation load that is imposed on the microcomputer 20 to calculate the d-axis and q-axis current command values idc, iqc.

3. Second Embodiment

Next, the motor controller according to a second embodiment of the present invention will be explained hereunder. A basic configuration of the motor controller according to the present embodiment is similar to the first embodiment and is given as shown in FIG. 2, and the same reference symbols are affixed to the same or corresponding portions. In the following, mainly a difference from the first embodiment will be explained hereunder.

Figure 10:
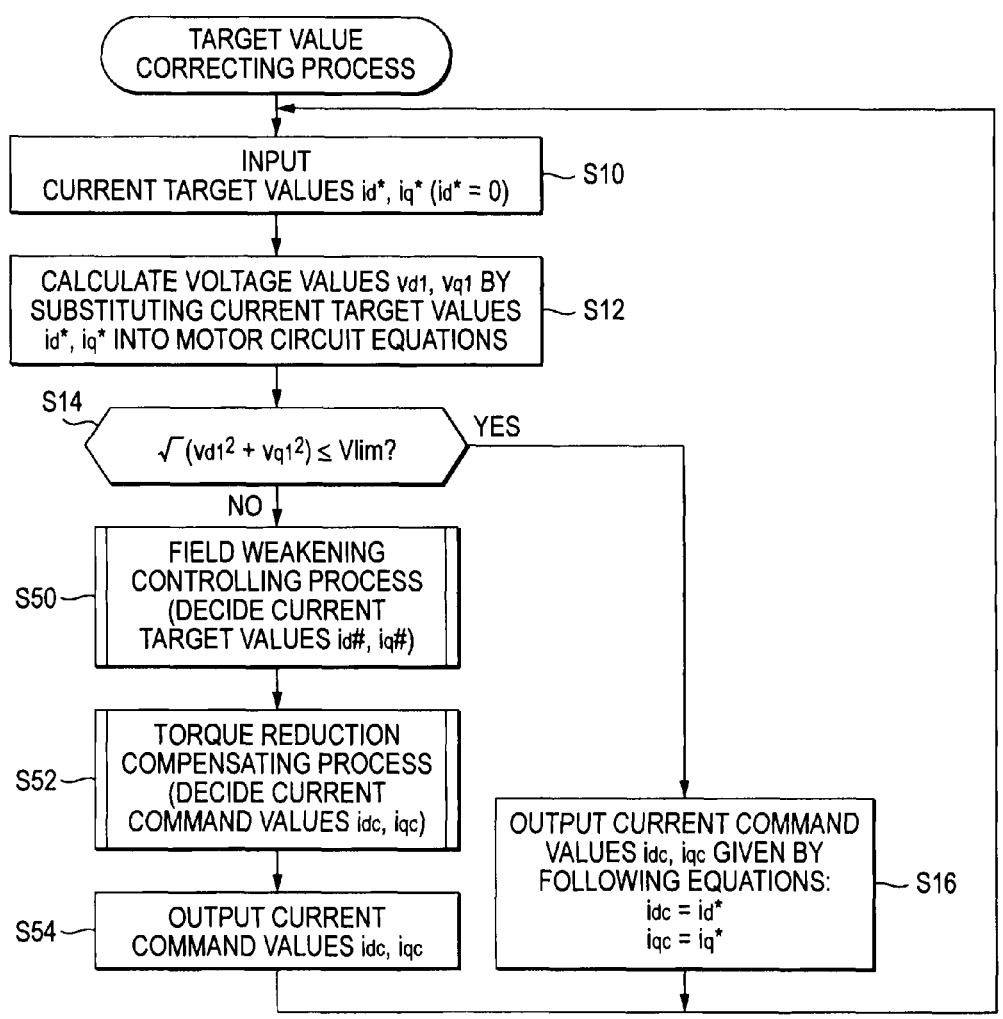
FIG. 10(a) is a flowchart showing a target value correcting process in a second embodiment of the present invention.
FIG. 10(b) is a flowchart showing a torque reduction compensating process in a second embodiment of the present invention.
Figure 10:
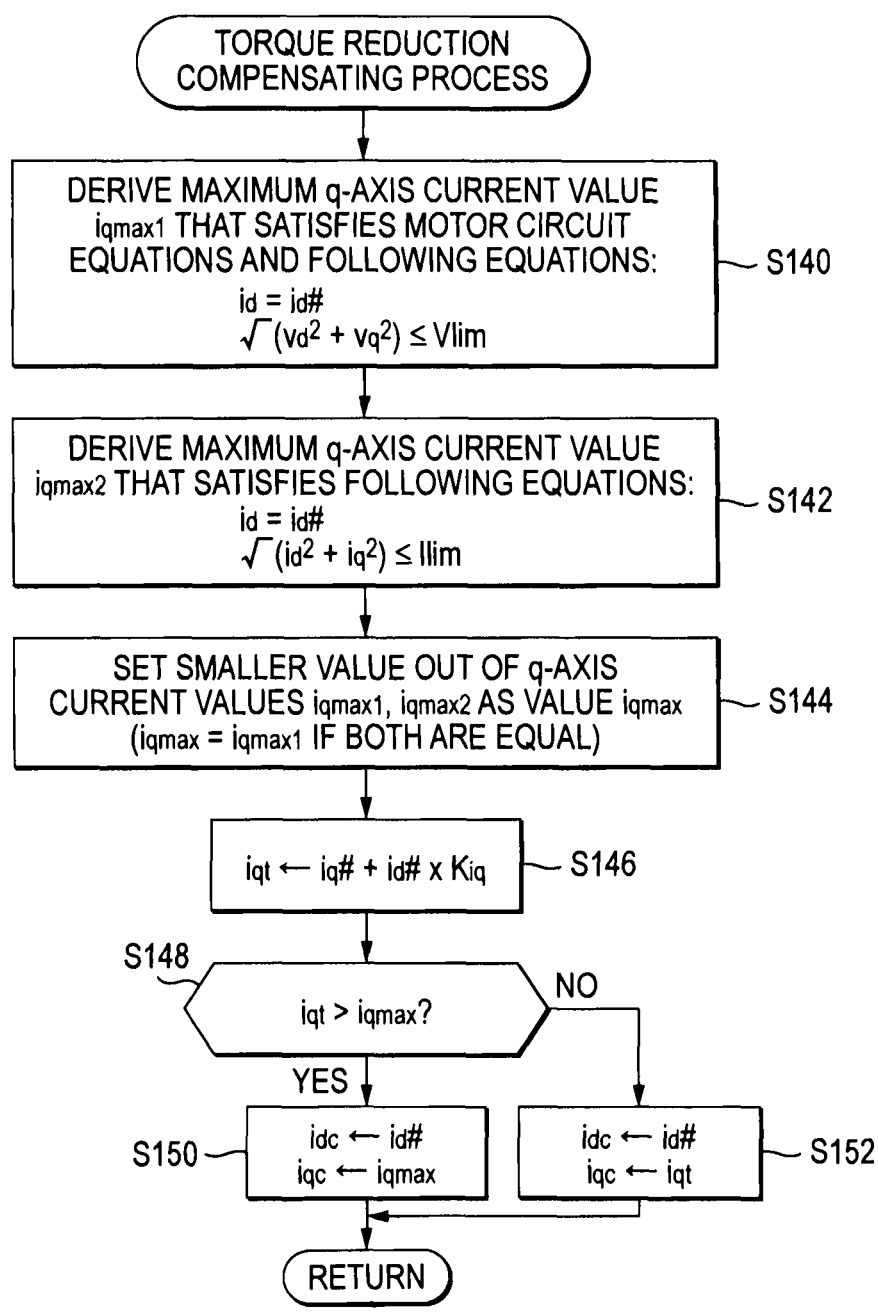

In the present embodiment, the target value correcting process that the microcomputer 20 executes to implement the target value correcting portion 26 is different from the first embodiment. FIG. 10 is a flowchart showing a target value correcting process that the microcomputer 20 executes to implement the target value corrector 26 in the present embodiment. An operation of the target value corrector 26 according to the present configurative example will be explained with reference to FIG. 10 hereunder. Here, the process applied when the first d-axis and q-axis voltage values vd1, vq1 being obtained by substituting the current target values id=id*, iq=iq* into the motor circuit equations (11) (12) do not exceed the voltage limit given by the equation (13) is similar to the first embodiment. Therefore, their explanation will be omitted herein by the same step numbers (steps S10 to S16 in FIG. 4(a)). In this case, the d-axis and q-axis current target values id*, iq* do not undergo the correction and are output from the target value corrector 26 as the d-axis and q-axis current target values id*, iq* as they are (steps S10 to S16 in FIG. 10(a)).

When the first d-axis and q-axis voltage values vd1, vq1 exceed the voltage limit, i.e., it is decided as "No" in step S14, the field weakening controlling process is executed, like the case of the first embodiment. The d-axis and q-axis current target values id#, iq# in the field weakening control, which do not exceed the voltage limit and the current limit given by following equations (29)(30), are decided (S50).

$$\sqrt{(vd^2+vq^2)} \leq Vlim \quad (29)$$

$$\sqrt{(id^2+iq^2)} \leq Ilim \quad (30)$$

Where vd, vq denote the d-axis and q-axis voltages applied to the brushless motor 1 respectively, id, iq denote the d-axis and q-axis currents supplied to the brushless motor 1 respectively, and Vlim, Ilim denote the voltage limit value and the current limit value being input from the limit value setting portion 23 respectively.

As the concrete contents of the field weakening controlling process in step S50, any one of the contents shown in FIG. 4(b), FIG. 6, FIG. 8 (first to third configurative examples) may be employed. Any contents may be employed other than the above contents if the d-axis and q-axis current target values id#, iq# in the field weakening control can be calculated in response to the d-axis and q-axis current target values id*, iq* not to exceed the voltage limit and the current limit.

When such field weakening controlling process is ended, the torque reduction compensating process shown in FIG. 10(b) is executed (S52).

In this torque reduction compensating process, first the target value corrector 26 derives the maximum q-axis current value iq that satisfies the motor circuit equations (11)(12) and following equations (31)(32), as a first maximum q-axis current value iqmax1 (S140).

$$id=id\# \quad (31)$$

$$\sqrt{(vd^2+vq^2)} \leq Vlim \quad (32)$$

Figure 11:
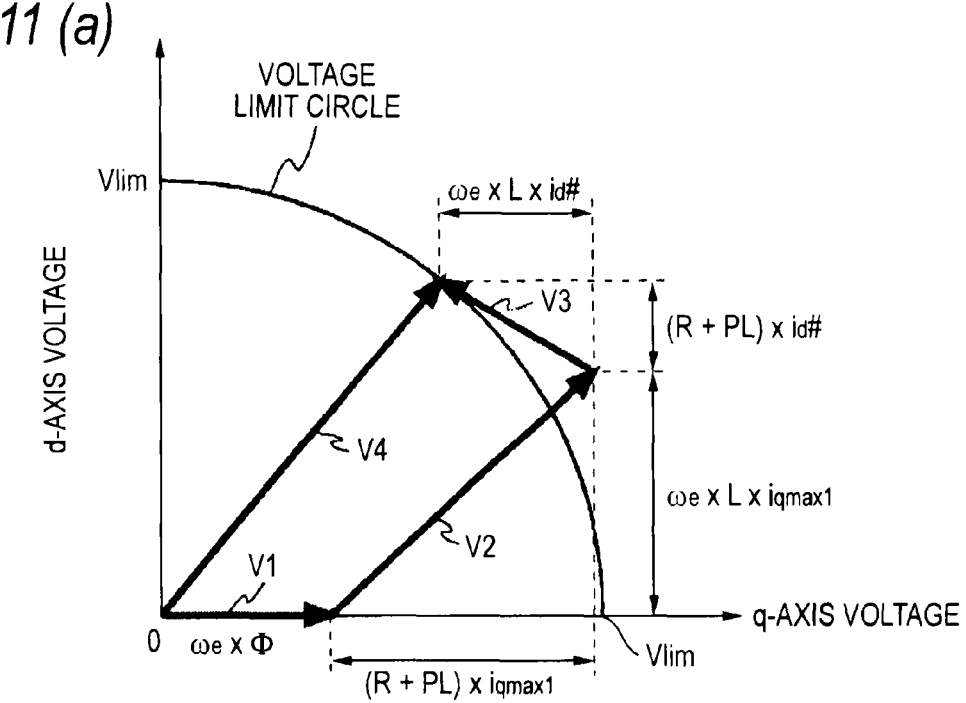
FIG. 11(a) is a vector diagram explaining a torque-reduction compensating process in the second embodiment.
FIG. 11(b) is a vector diagram explaining a torque-reduction compensating process in the second embodiment.
Figure 11:
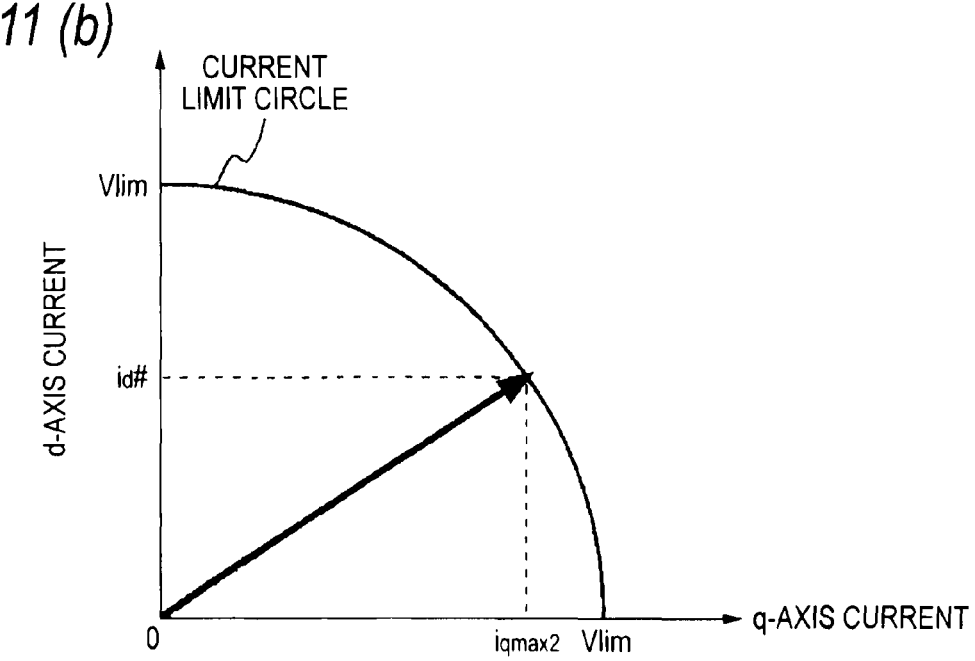

As a result, the maximum value of the q-axis current target value required when the q-axis current target value iq=iq# in the field weakening control is changed in the range of the voltage limit (the equation (32)) not to change the d-axis current target value id=id# as the command value obtained by the field weakening controlling process can be obtained as the first maximum q-axis current value iqmax1. According to such first maximum q-axis current value iqmax1, as shown in FIG. 11(a), a magnitude of the synthesis vector V4 consisting of the voltage vector V1 produced by the back electromotive force ωeΦ, the voltage vector V2 produced by the first maximum q-axis current value iqmax1, and the voltage vector V3 produced by the d-axis current target value id# in the field weakening control becomes equal to the voltage limit value Vlim.

Then, the target value corrector 26 derives the maximum q-axis current value iq that satisfies following equations (33) (34), as a maximum q-axis current value iqmax2 (S142).

$$id=id\# \quad (33)$$

$$\sqrt{(id^2+iq^2)} \leq Ilim \quad (34)$$

As a result, the maximum value of the q-axis current target value required when the q-axis current target value iq=iq# in the field weakening control is changed in the range of the voltage limit (the equation (34)) not to change the d-axis current target value id=id# as the command value obtained by the field weakening controlling process can be obtained as the second maximum q-axis current value iqmax2. According to such first maximum q-axis current value iqmax2, as shown in FIG. 11(b), a magnitude of the current vector whose d-axis component is the d-axis current target value id# and whose q-axis component is the second maximum q-axis current value iqmax2 becomes equal to the current limit value Ilim.

Then, the target value corrector 26 sets the smaller value out of the first maximum q-axis current value iqmax1 and the second maximum q-axis current value iqmax2 as a limited maximum q-axis current value iqmax (S144). In this case, if both the first maximum q-axis current value iqmax1 and the second maximum q-axis current value iqmax2 are equal, the target value corrector 26 sets iqmax=iqmax1.

Figure 12:
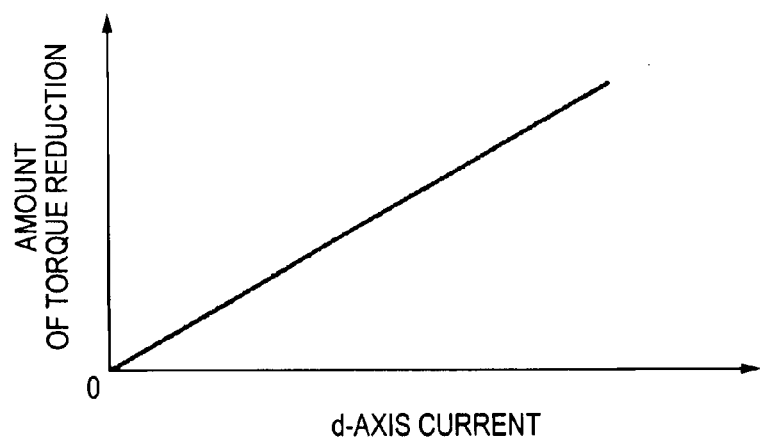
FIG. 12(a) is a characteristic view explaining the torque-reduction compensating process in the second embodiment.
FIG. 12(b) is a characteristic view explaining the torque-reduction compensating process in the second embodiment.
Figure 12:
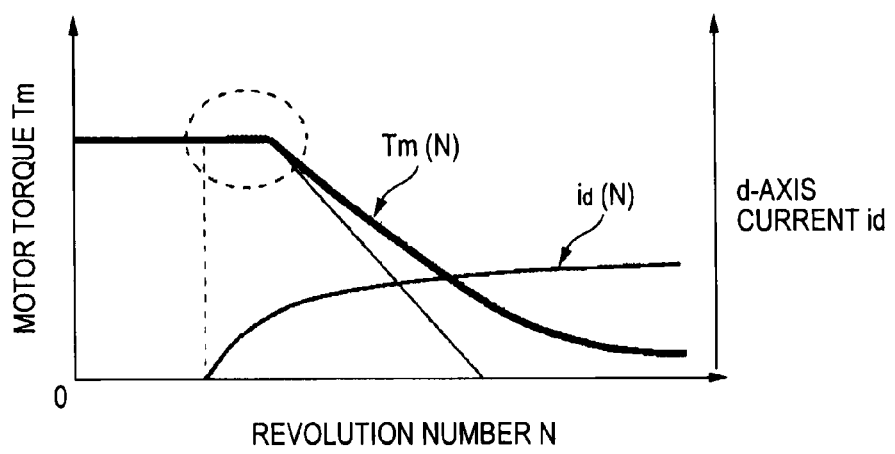

Then, the target value corrector 26 calculates a torque-compensated q-axis current value iqt by correcting the q-axis current target value iq# in the field weakening control according to a following equation so as to compensate a reduction in the motor torque (a reduction in an ellipse indicated with a dotted line shown in FIG. 13(b)) caused when the d-axis current indicated by the d-axis current target value id# in the field weakening control is supplied to the brushless motor 1 (S146).

$$iqt=iq\#+id\# \times Kiq \quad (35)$$

Where id# is the d-axis current target value in the field weakening control, and Kiq is a factor for giving a q-axis current compensation value to compensate a reduction in the motor torque caused by a reduction in the d-axis direction magnetic flux due to the d-axis current (referred to as a "reduction-in-torque compensation factor" hereinafter). In the present embodiment, the reduction-in-torque compensation factor Kiq is held as a constant in a predetermined memory in the microcomputer 20 under the assumption that a relation between the d-axis current in the brushless motor 1 and an amount of reduction of the motor torque has a proportional relation as shown in FIG. 12. A concrete value of this reduction-in-torque compensation factor Kiq is decided in advance based on the design values of the motor controller and the brushless motor 1, the computer simulation or the experiment, and the like. In this case, when the reduction-in-torque compensation factor Kiq depends on the current value, a map or a relation that correlates the q-axis current compensation value corresponding to the id#×Kiq with the d-axis current and/or the q-axis current may be held in the predetermined memory in the microcomputer 20, and the q-axis current compensation value may be detected from the map or the relation.

Then, the target value corrector 26 decides whether or not the torque-compensated q-axis current value iqt calculated as above is larger than the limited maximum q-axis current value iqmax detected in step S144 (S148).

As the result of decision in step S148, when the torque-compensated q-axis current value iqt is larger than the limited maximum q-axis current value iqmax, the d-axis current target value id# in the field weakening control is set as the d-axis current command value idc, and the limited maximum q-axis current value iqmax is set as the q-axis current command value iqc (S150). Then, the process is returned from the torque reduction compensating process, and goes to the target value correcting process in step S54.

As the result of decision in step S148, when the torque-compensated q-axis current value iqt is less than the limited maximum q-axis current value iqmax, the d-axis current target value id# in the field weakening control is set as the d-axis current command value idc, and the torque-compensated q-axis current value iqt is set as the q-axis current command value iqc (S152). Then, the process is return from the torque reduction compensating process, and goes to the target value correcting process in step S54.

In step S54 of the target value correcting process, the target value corrector 26 outputs the d-axis and q-axis current command values idc, iqc calculated as above. The open-loop controller 31, the d-q axis/three-phase converter 32, the three-phase/PWM modulator 12, and the motor driving circuit 13 are operated based on these d-axis and q-axis current command values idc, iqc similarly to the first embodiment, and thus the brushless motor 1 is driven. In this case, as can be seen from steps S144 to S152 of the torque reduction compensating process, the smallest value out of the torque-compensated q-axis current value iqt, the first maximum q-axis current value iqmax1, and the second maximum q-axis current value iqmax2 is set as the q-axis current command value iqc. Also, steps S144, S148 to S152 constitute a selecting section for selecting the q-axis current command value iqc.

Figure 13:
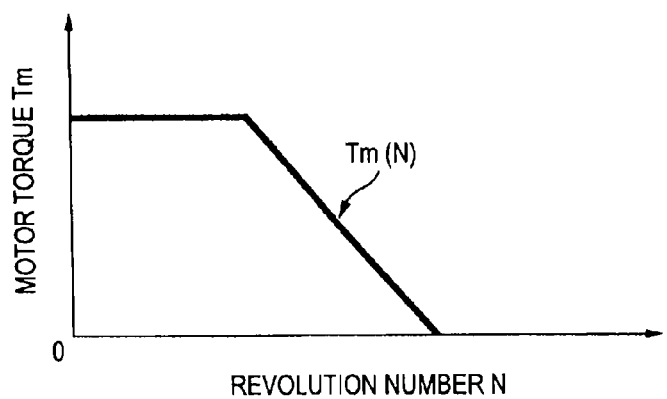
FIG. 13(a) is a characteristic view showing a relation between a revolution number of a motor and a motor torque when a field-weakening control is not applied in the motor controller in the prior art.
FIG. 13(b) is a characteristic view showing a relation between a revolution number of a motor and a motor torque when a field-weakening control is applied in the motor controller in the prior art.
Figure 13:
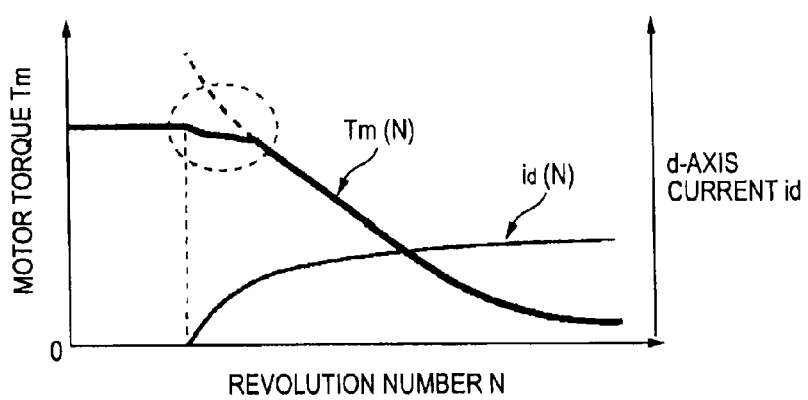

In the field weakening controlling process in the prior art, as shown in an ellipse indicated with a dotted line shown in FIG. 13($b$), a reduction in the motor torque Tm (N) appears on account of a reduction in the d-axis direction magnetic flux due to the d-axis current. In contrast, in the present embodiment, the d-axis and q-axis current command values idc, iqc can be set by the field weakening control (id≠0) such that the q-axis current flows within the range of the voltage limit and the current limit, and the q-axis current target value iq# can be corrected in the range of the voltage limit and the current limit to compensate a reduction in the motor torque caused due to the d-axis current in the field weakening control upon setting these d-axis and q-axis current command values idc, iqc (S146 to S152). Therefore, according to the present embodiment, in addition to the similar advantages to those in the first embodiment, as shown in FIG. 12($b$), the stable motor output can be obtained up to the high revolution range even when the field weakening control is introduced.

4. Variation

In the motor controllers according to the first and second embodiments, the brushless motor 1 is driven by the open-loop control. But the present invention is no limited to approach. The present invention is applicable to the motor controller in which a section for detecting the currents in respective phases is provided to drive the brushless motor 1 by the feedback control.

Also, the motor controllers according to the first and second embodiments are constructed to drive the three-phase brushless motor 1. But the present invention is no limited to configuration. The present invention is applicable to the motor controller that drives the brushless motor in four phases or more.

Here, the present invention is applicable to not only the column assist type electronic power steering apparatus but also the pinion assist type or rack assist type electronic power steering apparatus. Also, the present invention is applicable to the motor controller employed in other applications except the electronic power steering apparatus.

The invention claimed is:

1. A motor controller capable of applying a field-weakening control to drive a brushless motor, comprising:
a command current setting section that decides d-axis and q-axis current command values indicating a current that is to be supplied to the brushless motor;
a control operating section that calculates d-axis and q-axis voltage command values indicating a voltage that is to be applied to the brushless motor, based on the d-axis and q-axis current command values decided by the command current setting section; and
a driving section that drives the brushless motor based on the d-axis and q-axis voltage command values calculated by the control operating section,
wherein the command current setting section decides the d-axis and q-axis current command values within a predetermined voltage limit value and a predetermined current limit value so that the d-axis and q-axis voltage command values and the d-axis and q-axis current command values satisfy both inequalities given as follows, $$\sqrt{(vd^2+vq^2)} \leq Vlim,$$

$$\sqrt{(id^2+iq^2)} \leq Ilim,$$

where vd is the d-axis voltage command value, vq is the q-axis voltage command value, Vlim is the voltage limit value, id is the d-axis current command value, iq is the q-axis current command value, and Ilim is the current limit value.

2. The motor controller according to claim 1, wherein the command current setting section includes:
a target current setting section that sets a target current of the current to be supplied to the brushless motor; and
a target value correcting section that calculates the d-axis and q-axis current command values by correcting d-axis and q-axis components of the target value so that the d-axis and q-axis voltage command values vd, vq satisfy a following equation with regard to the voltage limit value Vlim, when the voltage that is to be applied to the brushless motor to supply the current of the target value to the brushless motor exceeds the voltage limit value Vlim, $$\sqrt{(vd^2+vq^2)} = Vlim.$$

3. The motor controller according to claim 1, wherein the command current setting section includes a reduction-in-torque compensating section that compensates the q-axis current command value so that a reduction in an output torque of the brushless motor caused by the d-axis current command value is compensated and both inequalities are satisfied,
wherein the control operating section calculates the d-axis and q-axis voltage command values by using the d-axis current command value and the corrected q-axis current command value subjected to a correction by the reduction-in-torque compensating section.

4. The motor controller according to claim 3, wherein the reduction-in-torque compensating section includes:
a first maximum value deciding section that calculates a maximum value, that is allowed for the q-axis current command value iq when the q-axis current command value iq is changed to satisfy an inequality indicating a limit given by the voltage limit value Vlim out of both inequalities, as a first maximum value;
a second maximum value deciding section that calculates another maximum value, that is allowed for the q-axis current command value iq when the q-axis current command value iq is changed to satisfy an inequality indicating a limit given by the current limit value Ilim out of both inequalities, as a second maximum value;

a correcting section that corrects the q-axis current command value so that a reduction in output torque of the brushless motor caused by the d-axis current command value is compensated; and a selecting section that selects a smallest value out of the q-axis current command value subjected to the correction by the correcting section, the first maximum value, and the second maximum value as the q-axis current command value subjected to the correction.

5. An electronic power steering apparatus for applying a steering assist force to a steering mechanism of a vehicle by a brushless motor, the electronic power steering apparatus comprising:

the motor controller set forth in claim 1, wherein the motor controller drives the brushless motor that applies the steering assist force to the steering mechanism.

\* \* \* \* \*